(12) United States Patent
Duarte et al.

(10) Patent No.: US 10,937,343 B2
(45) Date of Patent: Mar. 2, 2021

(54) DISPLAY DEVICE

(71) Applicant: The Coca-Cola Company, Atlanta, GA (US)

(72) Inventors: Lawrence Alexander Duarte, Centennial, CO (US); Lo Chi Kwong, Tuen Mun (HK); Shawn Roske, Minneapolis, MN (US); Mervin Perkins, Arvada, CO (US); Ryan West, Newnan, GA (US); Kathrine Marie Brown, Maple Grove, MN (US)

(73) Assignee: The Coca-Cola Company, Atlanta, GA (US)

(*) Notice: Subject to any disclaimer, the term of this patent is extended or adjusted under 35 U.S.C. 154(b) by 22 days.

(21) Appl. No.: 16/336,838

(22) PCT Filed: Sep. 25, 2017

(86) PCT No.: PCT/US2017/053290
§ 371 (c)(1),
(2) Date: Mar. 26, 2019

(87) PCT Pub. No.: WO2018/058055
PCT Pub. Date: Mar. 29, 2018

(65) Prior Publication Data
US 2020/0219424 A1    Jul. 9, 2020

Related U.S. Application Data

(60) Provisional application No. 62/399,767, filed on Sep. 26, 2016.

(51) Int. Cl.
*G09F 9/302* (2006.01)
*G09F 19/02* (2006.01)
(Continued)

(52) U.S. Cl.
CPC ........... *G09F 9/3026* (2013.01); *G09F 19/02* (2013.01); *G09F 21/04* (2013.01); *G09G 3/003* (2013.01)

(58) Field of Classification Search
CPC .......... G09F 9/372; G09F 9/3026; G09F 9/33; G09F 15/0056; G09F 21/04; G09F 19/02;
(Continued)

(56) References Cited

U.S. PATENT DOCUMENTS

| 4,654,989 A | 4/1987 | Fleming |
| 4,757,626 A | 7/1988 | Weinreich |

(Continued)

FOREIGN PATENT DOCUMENTS

| CN | 101546503 A | 9/2009 |
| DE | 102009019400 A1 | 11/2010 |

(Continued)

OTHER PUBLICATIONS

International Search Report and Written Opinion for PCT/US2017/053290 dated Jan. 4, 2018.
(Continued)

*Primary Examiner* — Muhammad N Edun
(74) *Attorney, Agent, or Firm* — Merchant & Gould P.C.

(57) ABSTRACT

A display device includes a housing with a grid assembly received therein. A plurality of light assemblies is coupled to the grid assembly, for example in a grid pattern to create a dynamic display area. Each of light assemblies has an actuator assembly, with each one of the actuator assemblies being individually controllable to move the corresponding light assembly between a retracted state and a plurality of extended states. A controller is coupled to each of the plurality of light assemblies and programmed to control the actuator assemblies to move the light assemblies between the retracted state and the plurality of extended states.

20 Claims, 16 Drawing Sheets

(51) Int. Cl.
*G09F 21/04* (2006.01)
*G09G 3/00* (2006.01)

(58) Field of Classification Search
CPC . G09F 19/22; G09F 9/37; G09F 27/00; G09F 19/226; G09G 3/32; G09G 3/003; G06F 3/1446; G06F 3/14
See application file for complete search history.

(56) References Cited

U.S. PATENT DOCUMENTS

| | | |
|---|---|---|
| 5,077,608 A | 12/1991 | Dubner |
| 5,086,287 A | 2/1992 | Nutzel |
| 5,525,000 A | 6/1996 | Belobraydich et al. |
| 5,717,423 A | 2/1998 | Parker |
| 5,793,918 A | 8/1998 | Hogan |
| 5,907,312 A | 5/1999 | Sato et al. |
| 6,189,246 B1 | 2/2001 | Gorthala |
| 6,433,761 B1 | 8/2002 | Remitz |
| 6,462,840 B1 | 10/2002 | Kravtsov |
| 6,546,655 B1 | 4/2003 | Hillstrom |
| 6,606,809 B2 | 8/2003 | Hillstrom et al. |
| 7,055,271 B2 | 6/2006 | Lutz et al. |
| 7,277,080 B2 | 10/2007 | Goulthorpe |
| 7,352,339 B2 | 4/2008 | Morgan et al. |
| 7,356,357 B2 | 4/2008 | DeCost et al. |
| 7,436,388 B2 | 10/2008 | Hillis et al. |
| 7,439,950 B2 | 10/2008 | Carlberg |
| 7,525,510 B2 | 4/2009 | Beland et al. |
| 7,551,771 B2 | 6/2009 | England, III |
| 7,552,553 B2 | 6/2009 | Kelly |
| 7,605,772 B2 | 10/2009 | Syrstad |
| 7,620,026 B2 | 11/2009 | Anschutz et al. |
| 7,653,569 B1 | 1/2010 | Zbib |
| 7,852,333 B2 | 12/2010 | Nishikawa et al. |
| 7,866,075 B2 | 1/2011 | Meeker et al. |
| 7,905,413 B2 | 3/2011 | Knowles et al. |
| 7,928,968 B2 | 4/2011 | Shon et al. |
| 7,948,450 B2 | 5/2011 | Kay et al. |
| 8,040,361 B2 | 10/2011 | Bachelder et al. |
| 8,081,158 B2 | 12/2011 | Harris |
| 8,152,062 B2 | 4/2012 | Perrier et al. |
| 8,232,976 B2 | 7/2012 | Yun et al. |
| 8,254,338 B2 | 8/2012 | Anschutz et al. |
| 8,289,274 B2 | 10/2012 | Sliwa et al. |
| 8,413,073 B2 | 4/2013 | Lee |
| 8,552,883 B1 | 10/2013 | Su |
| 8,576,212 B2 | 11/2013 | Lee et al. |
| 8,588,517 B2 | 11/2013 | Lee et al. |
| 8,606,043 B2 | 12/2013 | Kwon et al. |
| 9,257,061 B2 | 2/2016 | Jurewicz et al. |
| 9,269,283 B2 | 2/2016 | Jurewicz et al. |
| 9,640,118 B2 | 5/2017 | Jurewicz et al. |
| 9,812,033 B2 * | 11/2017 | Chari ............... G09B 21/004 |
| 9,885,466 B2 | 2/2018 | Jurewicz et al. |
| 10,208,934 B2 | 2/2019 | Jurewicz et al. |
| 2003/0080923 A1 | 5/2003 | Suyama et al. |
| 2004/0077285 A1 | 4/2004 | Bonilla et al. |
| 2004/0165006 A1 | 8/2004 | Kirby et al. |
| 2005/0017977 A1 | 1/2005 | Simpson et al. |
| 2005/0150147 A1 | 7/2005 | Berryman |
| 2005/0264430 A1 | 12/2005 | Zhang et al. |
| 2006/0055641 A1 | 3/2006 | Robertus et al. |
| 2006/0107567 A1 | 5/2006 | Liao |
| 2006/0285832 A1 | 12/2006 | Huang |
| 2007/0171674 A1 | 7/2007 | Deutsch |
| 2007/0244417 A1 | 10/2007 | Escriba Nogues |
| 2008/0010041 A1 | 1/2008 | McDaniel |
| 2008/0115187 A1 | 5/2008 | Decost et al. |
| 2008/0201208 A1 | 8/2008 | Tie et al. |
| 2008/0238889 A1 | 10/2008 | Thorne |
| 2008/0246757 A1 | 10/2008 | Ito |
| 2008/0266204 A1 | 10/2008 | Bartels et al. |
| 2009/0084010 A1 | 4/2009 | Dykstra |
| 2009/0177528 A1 | 7/2009 | Wu et al. |
| 2009/0184892 A1 | 7/2009 | Eberle et al. |
| 2010/0182340 A1 | 7/2010 | Bachelder et al. |
| 2010/0219973 A1 | 9/2010 | Griffin et al. |
| 2011/0128283 A1 | 6/2011 | Lee et al. |
| 2011/0175992 A1 | 7/2011 | Lee et al. |
| 2011/0193277 A1 | 8/2011 | Christenson |
| 2011/0225860 A1 | 9/2011 | Troiano et al. |
| 2011/0228058 A1 | 9/2011 | Hatasawa |
| 2011/0231231 A1 | 9/2011 | Cruz |
| 2011/0235332 A1 | 9/2011 | Cheung |
| 2012/0092337 A1 | 4/2012 | Tsao |
| 2012/0139919 A1 | 6/2012 | Shintani |
| 2012/0154438 A1 | 6/2012 | Cohen |
| 2012/0159820 A1 | 6/2012 | Van Saanen |
| 2012/0188235 A1 | 7/2012 | Wu et al. |
| 2012/0195463 A1 | 8/2012 | Shinkai |
| 2012/0224311 A1 | 9/2012 | Sutherland et al. |
| 2012/0242958 A1 | 9/2012 | Zuloff |
| 2013/0009951 A1 | 1/2013 | Kwon et al. |
| 2013/0041730 A1 | 2/2013 | LoBianco |
| 2013/0063561 A1 | 3/2013 | Stephan |
| 2013/0117121 A1 | 5/2013 | Raman et al. |
| 2013/0194059 A1 | 8/2013 | Parr |
| 2013/0265213 A1 | 10/2013 | Chen |
| 2013/0312300 A1 | 11/2013 | Lee |
| 2013/0321394 A1 | 12/2013 | Fisher et al. |
| 2014/0104389 A1 | 4/2014 | Dharmatilleke |
| 2014/0114708 A1 | 4/2014 | Campbell |
| 2014/0259824 A1 | 9/2014 | Jurewicz et al. |
| 2014/0267457 A1 | 9/2014 | Jurewicz et al. |

FOREIGN PATENT DOCUMENTS

| | | |
|---|---|---|
| GB | 2363506 A | 12/2001 |
| GB | 2393560 A | 3/2004 |
| GB | 2428433 A | 1/2007 |
| GB | 2435540 A | 8/2007 |
| JP | 4-14086 A | 1/1992 |
| JP | 10-268796 A | 10/1998 |
| JP | 3127447 B2 | 1/2001 |
| JP | 2001-333438 A | 11/2001 |
| JP | 2007-225638 A | 9/2007 |
| WO | 2005/025377 A1 | 3/2005 |

OTHER PUBLICATIONS

International Search Report and Written Opinion for PCT/US2014/029573 dated Sep. 18, 2014.

Extended European Search Report for Application No. 17854084.5 dated Apr. 2, 2020.

* cited by examiner

DISPLAY DEVICE

RELATED APPLICATION(S)

This application is a National Stage application of PCT International Patent Application No. PCT/US2017/053290, filed on Sep. 25, 2017, which claims benefit of priority to U.S. Provisional patent application Ser. No. 62/399,767, filed Sep. 26, 2016, which applications are incorporated herein by reference. To the extent appropriate, a claim of priority is made to each of the above disclosed applications.

BACKGROUND

Displays are an important component of most advertising portfolios. As with other real estate, location is key. Most displays are configured to catch the eyes of viewers, which can enhance the brands shown on the displays. In crowded display areas, it is important to make a display distinctive to optimize the impact of the display.

SUMMARY

In accordance with certain aspects of the present disclosure, a display device includes a housing with a grid assembly received therein. A plurality of light assemblies is coupled to the grid assembly, for example in a grid pattern to create a dynamic display area. Each of light assemblies has an actuator assembly, with each one of the actuator assemblies being individually controllable to move the corresponding light assembly between a retracted state and a plurality of extended states. A controller is coupled to each of the plurality of light assemblies and programmed to control the actuator assemblies to move the light assemblies between the retracted state and the plurality of extended states. In some examples, the housing is situated on a wheeled cart, and includes a removable stationary display area.

DETAILED DESCRIPTION

The examples described herein are related to display devices used for advertising.

In some examples, the display devices incorporate lighting and movement. The lighting and movement are configured to catch a viewer's attention. This can enhance the impact of the brand shown on the display device.

Figure 1:
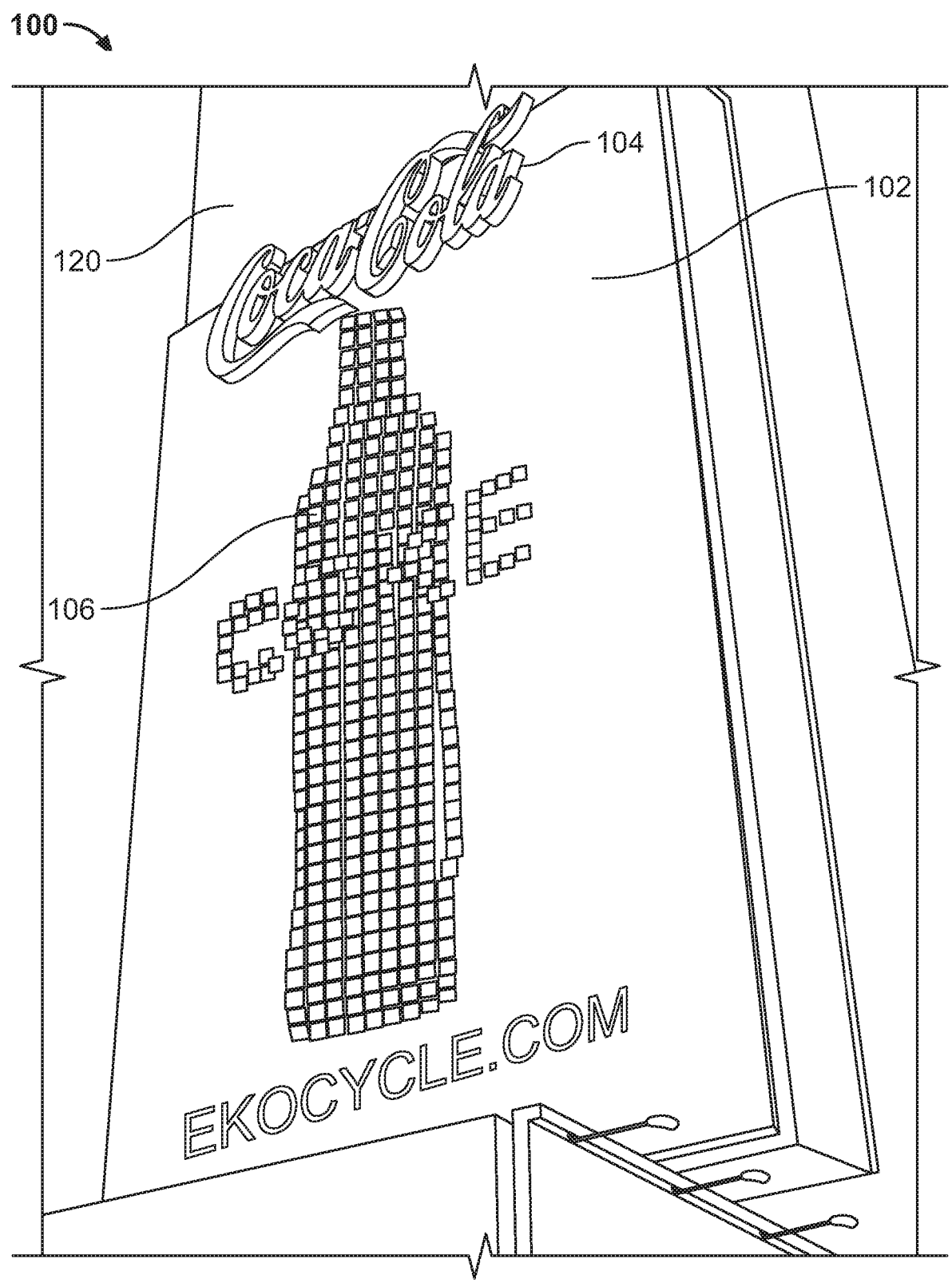
FIG. 1 is a perspective view of an example display device in an example environment.

FIG. 1 illustrates an example display device 100 is shown. The display device 100 may be mounted to an object such as a wall, the side of a building, a billboard, etc. The display device 100 includes a display area 102, which includes a stationary area 104 and a dynamic area 106. The display area 102 can include lighting to enhance the impact of the display device 100. For example, as described further below, the display area 102 can include a plurality of elements that are lit. In addition, the dynamic area 106 includes a plurality of light assemblies that selectively move in and out of the dynamic area 106 to create a moving, three-dimensional image. Commonly assigned U.S. Pat. Nos. 9,269,283 and 9,257,061, incorporated by reference, describe various examples of display devices.

Figure 6:
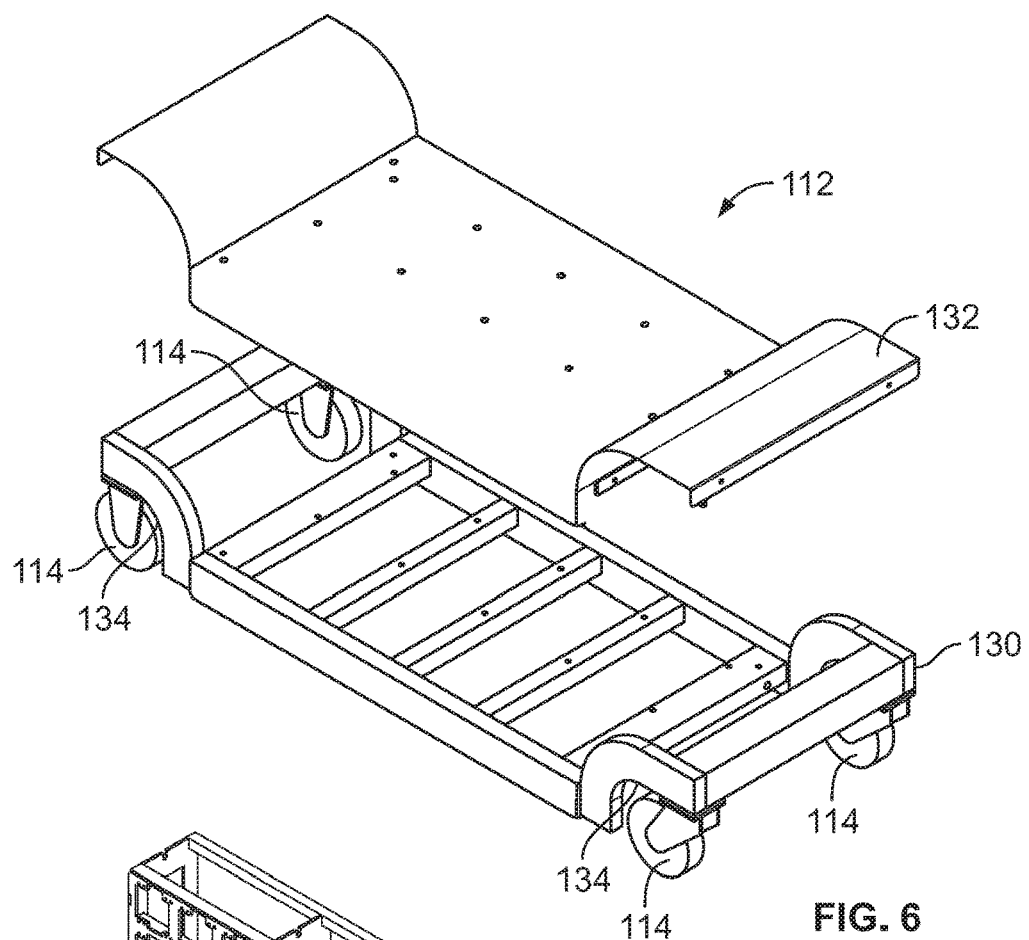
FIG. 6 is a perspective view of the wheeled cart of the display device shown in FIG. 2.

FIGS. 2-5 illustrate an example display device 100 that is configured to be freestanding and portable. The dynamic area 106 of the illustrated display device 100 is situated in a housing 110 that is mounted on a cart 112 with casters 114 for portability. FIG. 6 illustrates an example of the cart 112, which includes a cart frame 130 to which the casters 114 are attached. A cart cover 132 is fastened over the frame 130 to support the housing 110. The casters 114 may comprise, for example, eight-inch casters. In some embodiments, one or more of the casters 114 swivel to facilitate moving the display device 100, and some or all of the casters 114 are lockable to hold the display device 100 at a desired location. Further, the illustrated cart frame 130 includes a sloped or recessed area 134 adjacent each of the casters 114 for accommodating the casters 114. This allows using casters 114 that are large enough to support the weight of the display device 100, while also allowing maximizing the size of the dynamic display area 106.

The housing 110 includes side panels 116 with handles 118 attached thereto, and top and bottom panels extending between the side panels. As shown in the rear view of FIG. 3, the housing 110 includes a pair of rear access doors 120 with vents 121 configured to provide cooling air to interior of the housing 110. In one example, the housing is about 65.43 inches high, 45.27 inches wide, and 30.00 inches deep. Note that dimensions included in this disclosure are simply examples and not intended to be limiting. The specific dimensions disclosed may vary by typical manufacturing tolerances, for example, +/−0.02 inches. The illustrated housing 110 is sized to be able to roll though standard doorways once the header 108 is removed, thereby maximizing the portability and utility of the display device, while also maximizing the size of the dynamic display area 106.

In some embodiments, the stationary display area 104 is removable, comprising a lift-off header 108 that is situated on the top panel of the housing 110 that may be removed from the housing 110. The stationary display area 104 may be decorated with decals of graphics, have a back-lit display, and/or have a supplemental video display. Further, in some examples, the header 108 houses electronic components of the display device 100, such as an audio amplifier (not shown), audio speaker(s) 109, lighting (not shown) for the stationary display area 104, etc.

Figure 3:
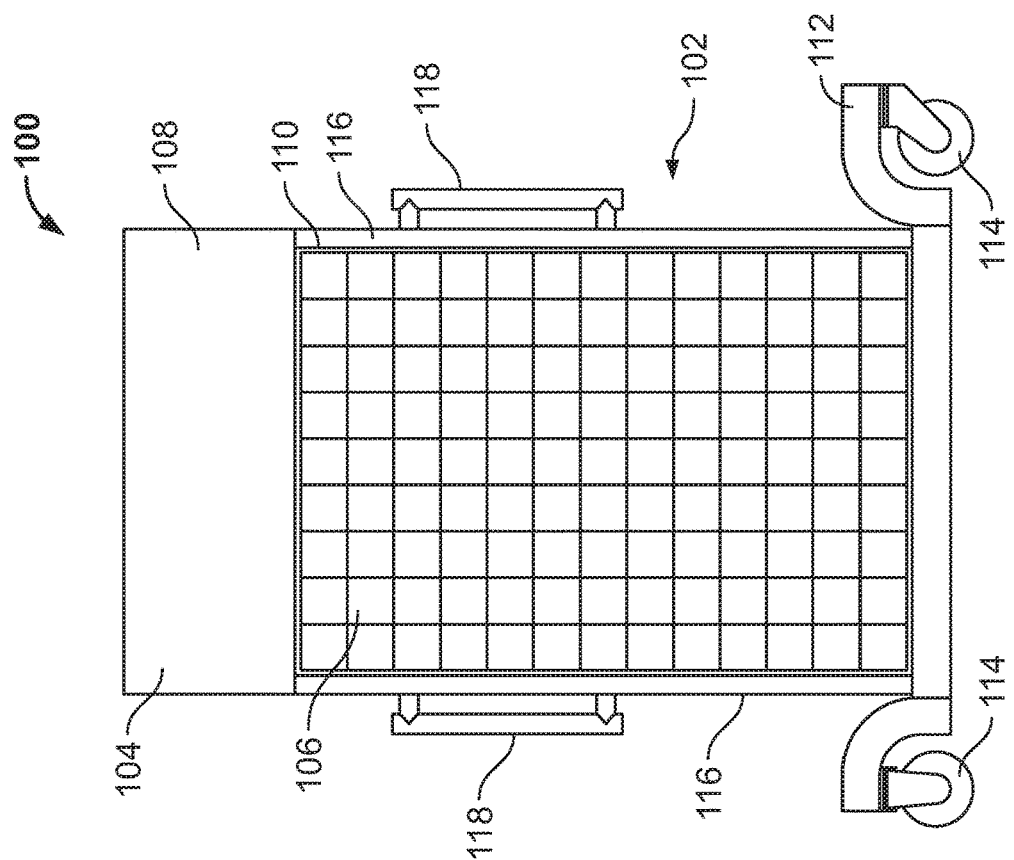
FIG. 3 is a front view of the display device of FIG. 2.
Figure 2:
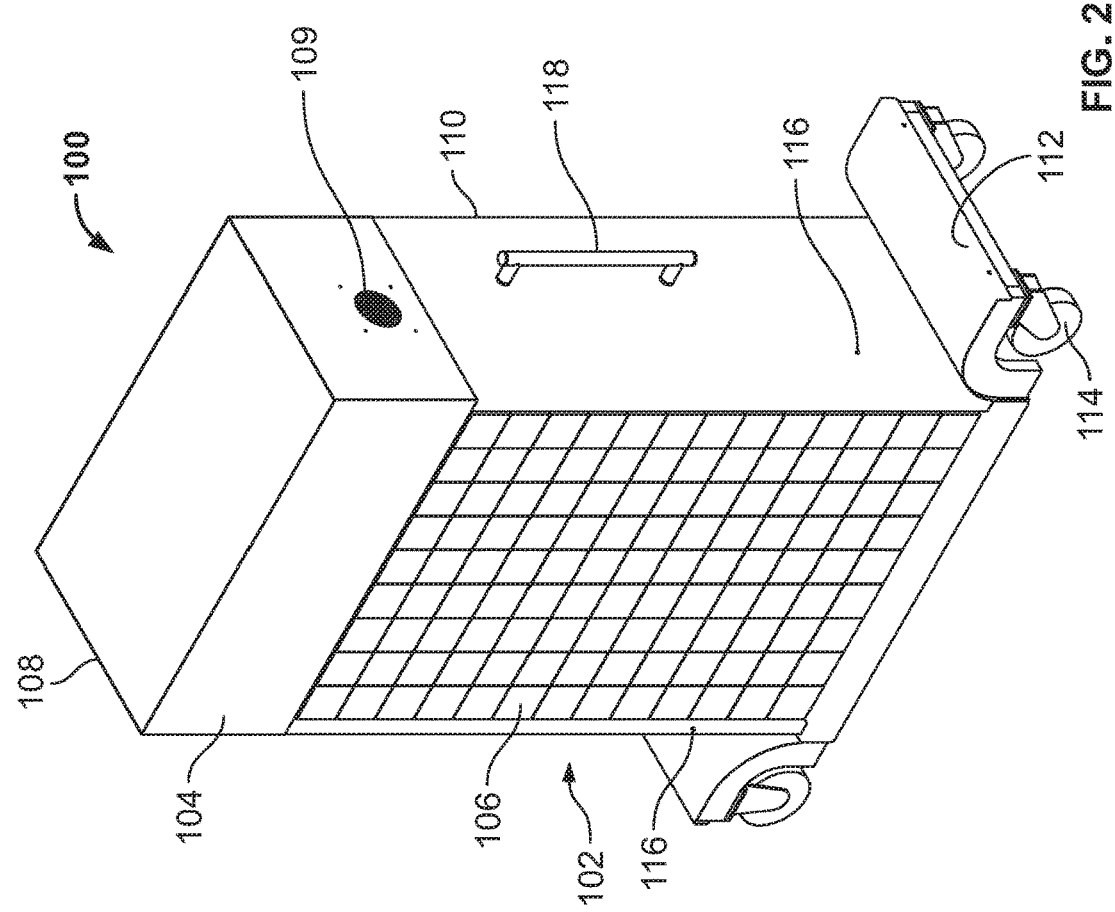
FIG. 2 is a perspective view of an example freestanding and portable display device.
Figure 5:
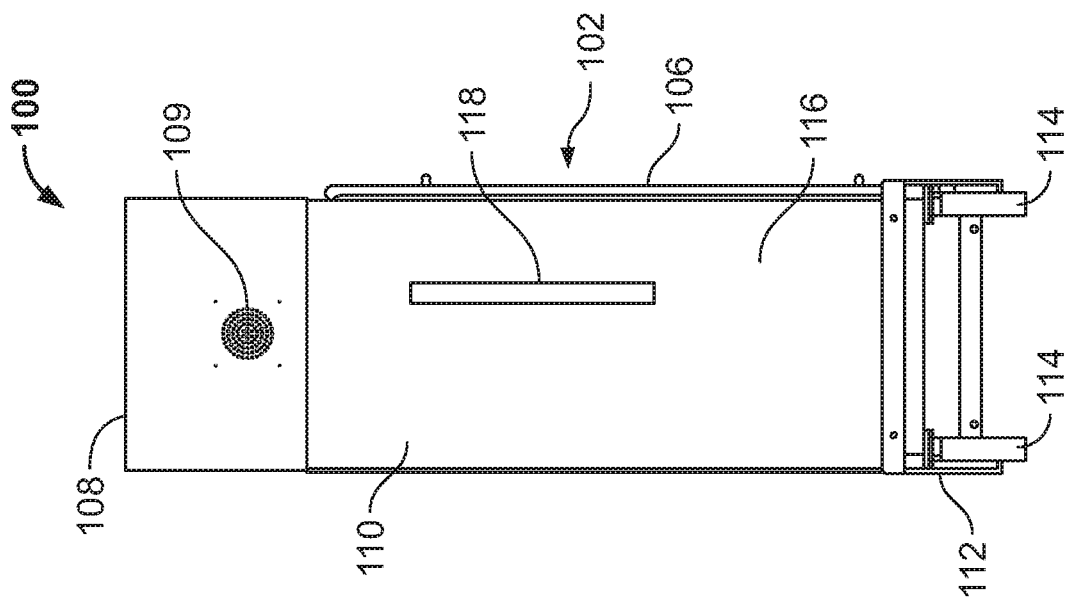
FIG. 5 is a side view of the display device of FIG. 2.
Figure 4:
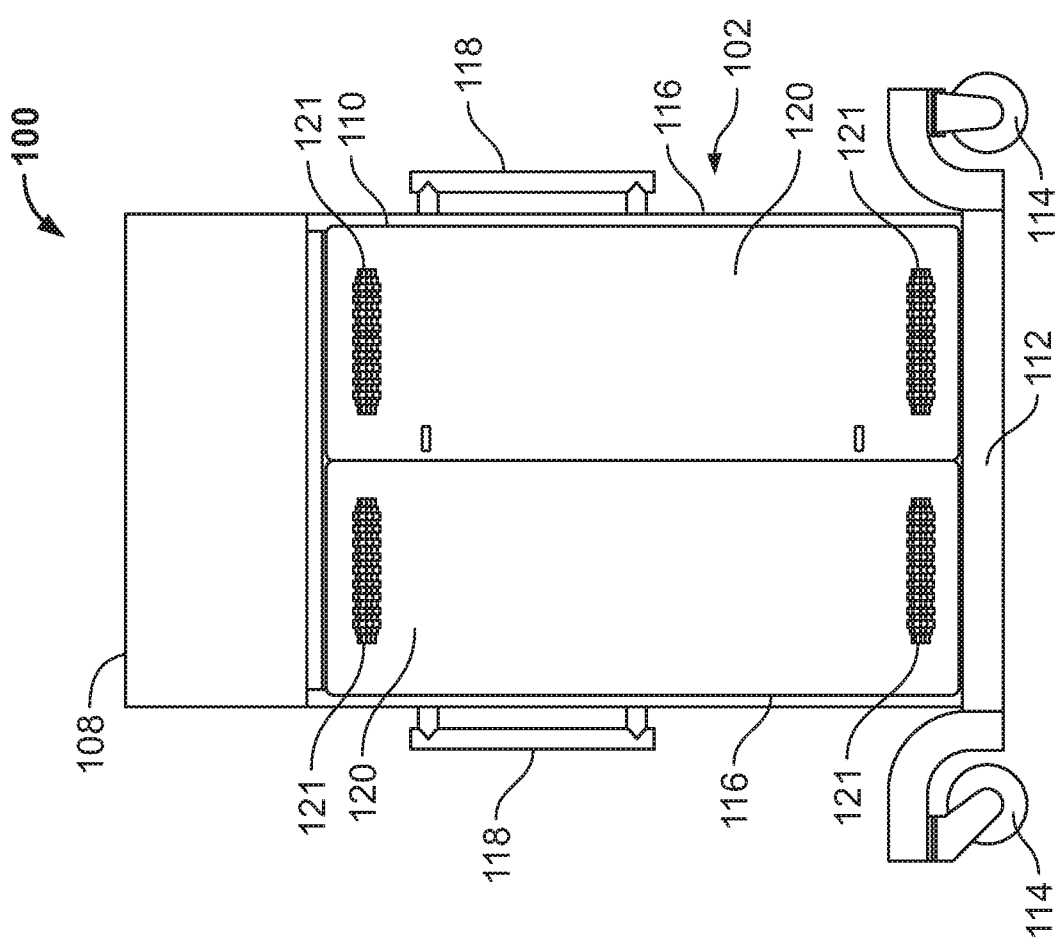
FIG. 4 is a rear view of the display device of FIG. 2.
Figure 7:
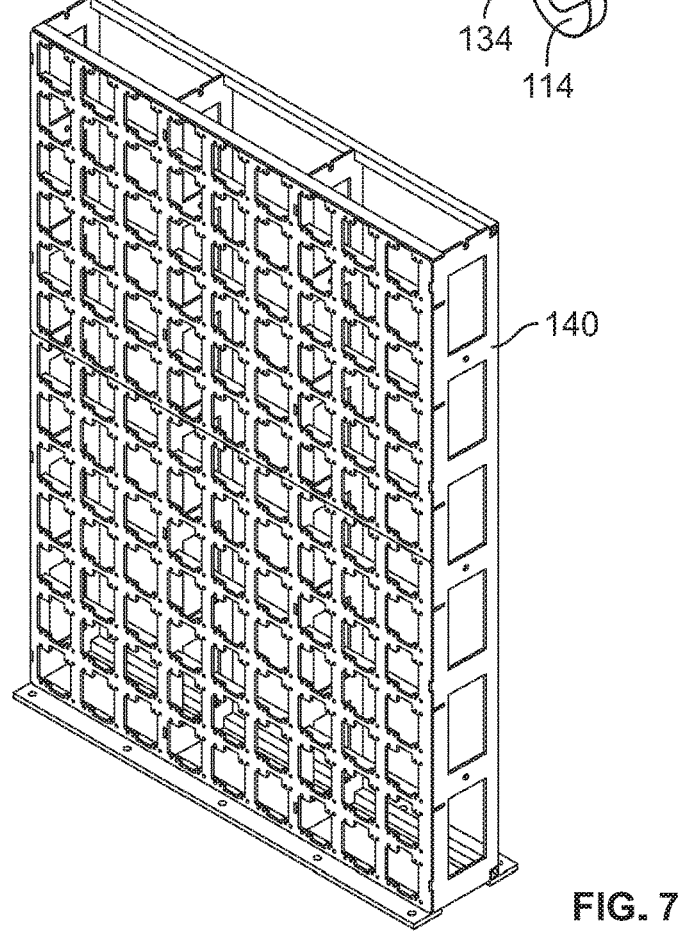
FIG. 7 is a perspective view of a grid assembly.
Figure 8:
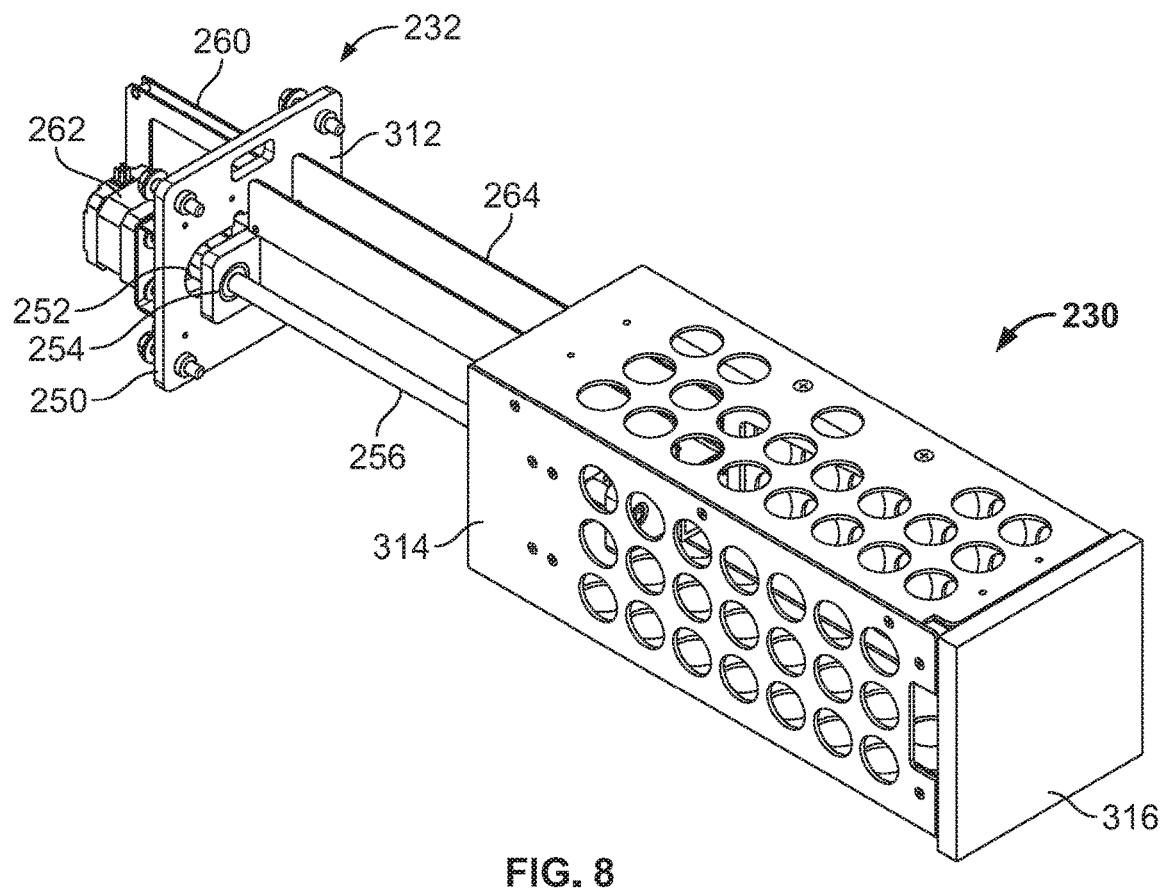
FIG. 8 is a perspective view of an example light assembly in an extended state.

FIG. 7 illustrates an example grid assembly 140 that is situated in the housing 110. As noted above, the dynamic area 106 includes a plurality of light assemblies that are movable and create the dynamic area 106 of the display device 100. The grid assembly 140 provides the base structure to which the light assemblies are mounted so as to form the dynamic area 106 of the display area 102 as shown in FIGS. 1 and 2. The rear access doors 120 shown in FIG. 3 provide access to the rear side of the grid assembly 140 and the light assemblies coupled thereto.

FIGS. 8-12 illustrate various aspects of an example of one of the movable light assemblies 230. In the example shown in FIG. 2, the grid assembly 140 supports 117 movable light assemblies 230 arranged in a 9×13 grid. Accordingly, the dynamic display area 106 includes 117 movable light assemblies. In other embodiments, the light assemblies 230 are arranged in larger or smaller grid arrangements depending on the desired size of the dynamic display area 106. For example, in other implementations, the light assemblies are arranged in a 10×14 grid to include 140 light assemblies. The light assemblies 230 are arranged at a front side of the housing 110 to create the dynamic portion 106 of the display. The light assemblies 230 are thus arranged opposite the rear access doors 120 so as to provide access to the light assemblies.

Each of the light assemblies 230 includes an actuator assembly 232 configured to move the light assemblies in and out of the dynamic area 106. More specifically, each of the actuator assemblies 232 includes a moving cube 314 movingly mounted to a stationary core 312 that is mounted to the grid assembly 140 such that the cube 314 is laterally movable relative to the grid assembly 140. The moving cube 314 includes two L-shaped aluminum panels 314a, 314b, attached to a bracket 266 and positioned about a cable tray 264 fastened on top of a rail 272. The rail 272 is attached to a back plate 250 at one end, with the opposite end connected to an attachment bracket 270, with an end plate 268 connecting an LED module 316 to the attachment bracket 270. The panels 314a, 314b may also attach to the attachment bracket 270.

The back plate 250 has a bearing block 252 attached thereto with a radial ball bearing 254 supporting a threaded rod 256. One end of the threaded rod 256 is connected to the panels 314a, 314b via a dampener bushing 276 and vibration isolator spacer 274, and the other end is actuated by an actuator 262 configured to extend and retract the threaded rod 256 to selectively position the LED module 316 laterally. The actuator 262 may be, for example, a stepper motor or servo motor. The actuator 262 is mounted to the back plate 250 via vibration isolator spacers 258. A circuit board assembly 260 is further mounted to the back plate 250 and provides electrical components and controller circuitry for operating the actuator 262. The actuator 262 is electrically controlled and moves the moving cube 314 via the rod 256 to any of a plurality of extended positions. The movement can be precisely controlled, so that the position of the moving cube 314 is known. For example, in one embodiment, control is as precise as 0.0079 inches, with a position range of 1 to 29,000.

Figure 9:
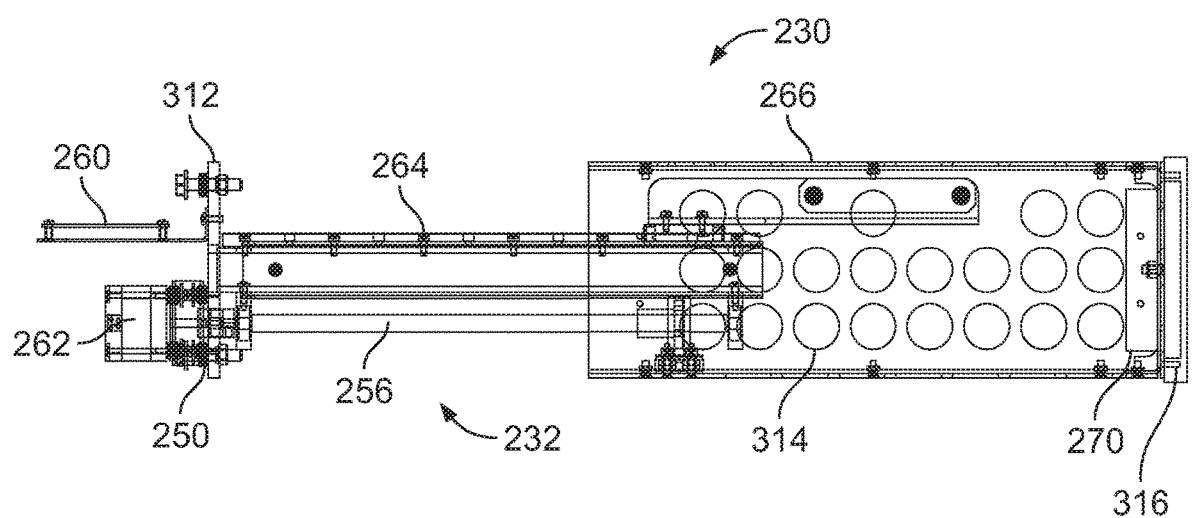
FIG. 9 is a top view of the light assembly of FIG. 8 in an extended state.
Figure 10:
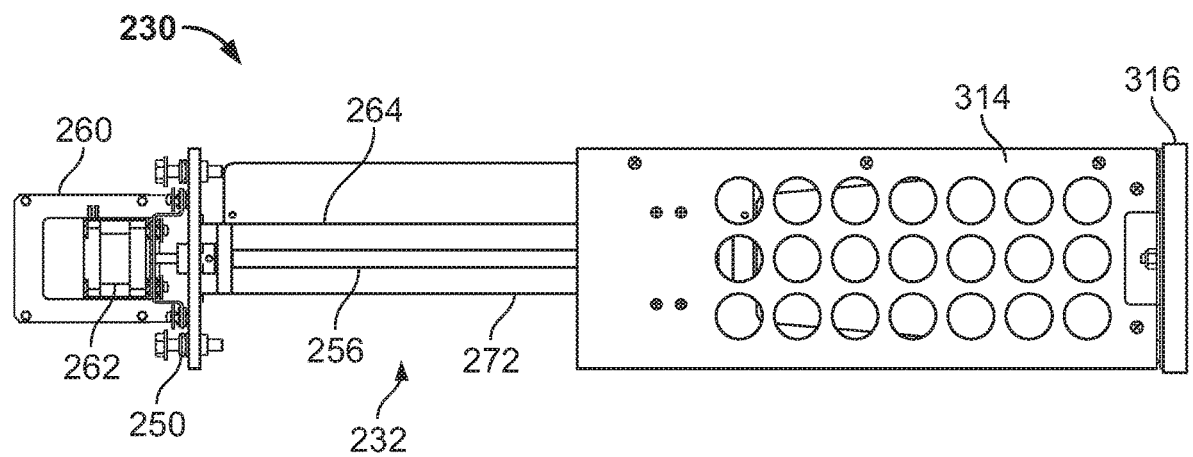
FIG. 10 is a side view of the light assembly of FIG. 8 in an extended state.
Figure 11:
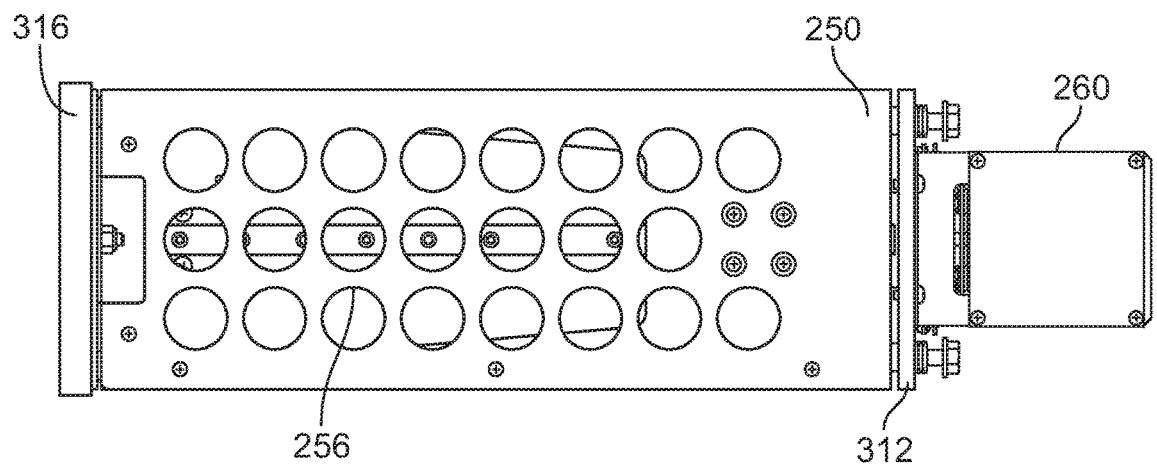
FIG. 11 is a side view of the light assembly of FIG. 8 in a retracted state.
Figure 12:
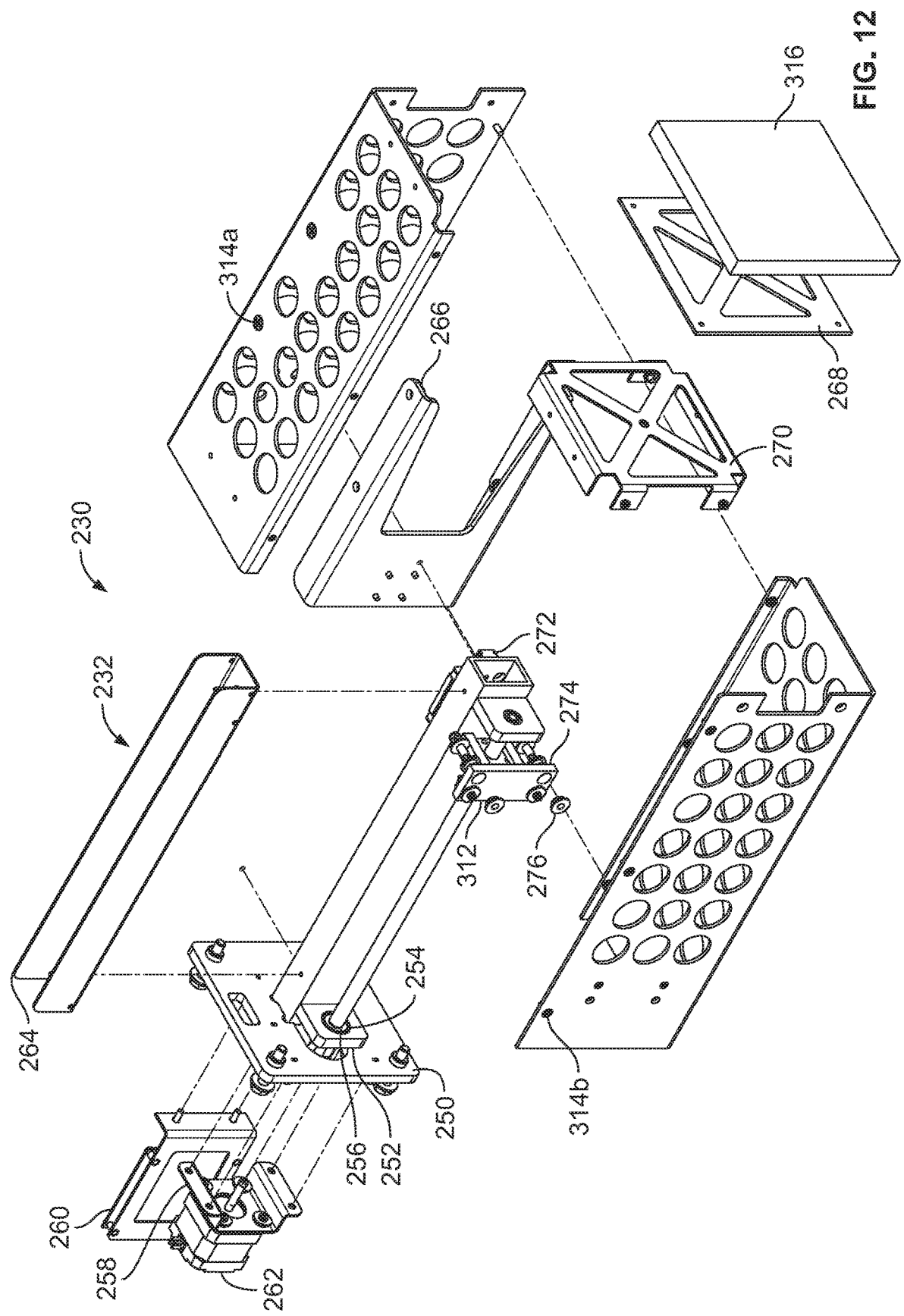
FIG. 12 is an exploded perspective view of the light assembly of FIG. 8.
Figure 13:
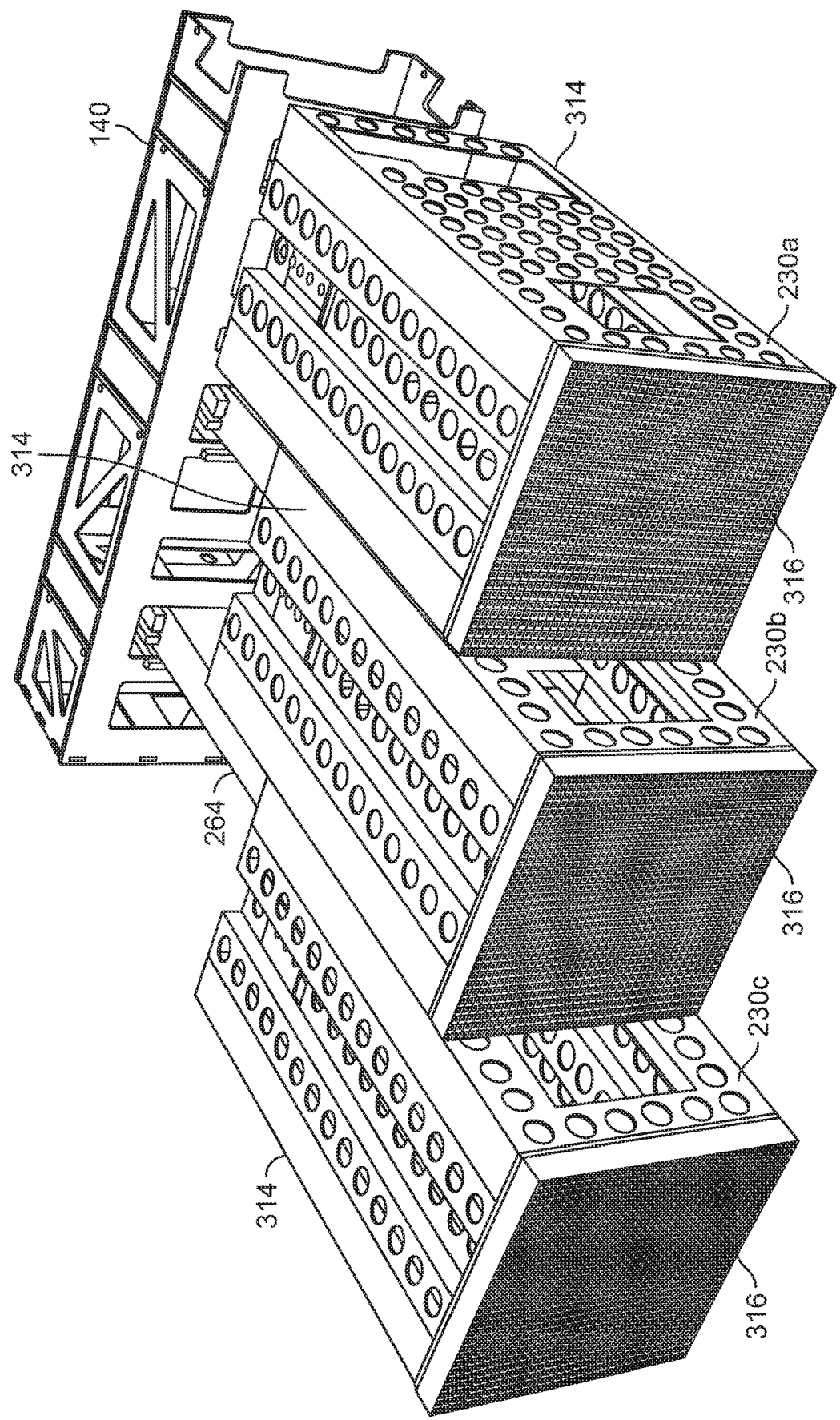
FIG. 13 is a perspective view of three of the light assemblies of FIG. 8 shown in extended, retracted and intermediate states.

FIGS. 9 and 10 show the moving cube 314, including the LED module 316, fully extended, while FIG. 11 shows the moving cube 314 in a fully retracted position. FIG. 13 illustrates three of the light assemblies 230a, 230b, 230c in various positions. As noted above, the back plate 250 of each of the light assemblies 230 is fixedly attached to the grid assembly 140, and the moving cube 314 with the LED module 316 at the outer end thereof are moved as desired via the actuator 262. In FIG. 13, the rightmost light assembly 230a is in a fully retracted position and the leftmost light assembly 230c is in a fully extended position, while the middle light assembly 230b is in an intermediate position.

In the illustrated example, when the moving cube 314 is fully extended, the LED module 316 is moved about 7 inches from the fully retracted position. However, other lengths could be used depending on the amount of movement required.

In some examples, the actuator 262 includes a model F12-BC linear actuator made by W-Robit of Taiwan, which can drive up to 44 pounds, with a maximum drive speed of 40 inches per second. In another example, a PAC-UGT040D actuator made by PBC Linear of Roscoe, Ill., is used. Some examples include a model BCH U04 manufactured by Schneider Electric of Palatine, Ill., with a LXM23A servo driver system and Modicon M258 logic controller, also manufactured by Schneider Electric. In still other examples, the actuator 262 includes a model SM23165DT motor made by Moog Animatics, of Santa Clara, Calif.

The LED modules 316 mounted to each of the moving cubes 314 each include a plurality of LEDs, such as an NSSM032T LED module made by Nichia Corporation of Japan. Such an LED module is a 3-in-1 SMD LED, although other types can be used. In this example, the LED module 316 is about five inches in height and width. The LED module 316 is configured to provide a plurality of colors, and each LED module 316 is individually controllable, as described below.

In example embodiments, the LED modules 316 can be configured to display one or a plurality of colors. For example, the LED modules 316 can be configured to display text, pictures, or other effects. In this example, light assemblies 230 have a 4 millimeter LED pitch size. By grouping the LED modules 316, a larger effect, such as a larger picture or text, can be created on the display area 102. In yet another alternative, the brightness of the lights in the LED modules 316 is configurable to create different appearances. For example, the lights can be dimmed or otherwise dulled to form depth and other visual effects, particularly around the edges of the display device 100.

Figure 16:
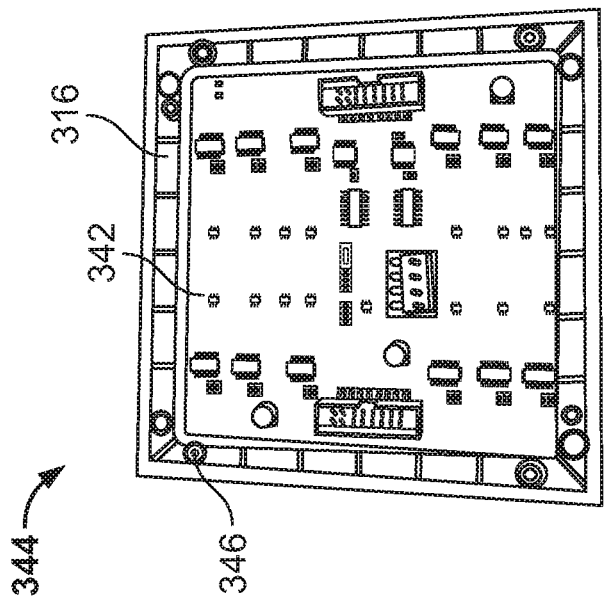
FIG. 16 is a front view of the portion of the LED module of FIGS. 14 and 15 with the outside mask removed.
Figure 15:
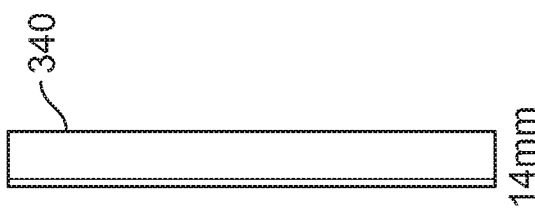
FIG. 15 is a side view of a portion of the example LED module shown in FIG. 14.
Figure 14:
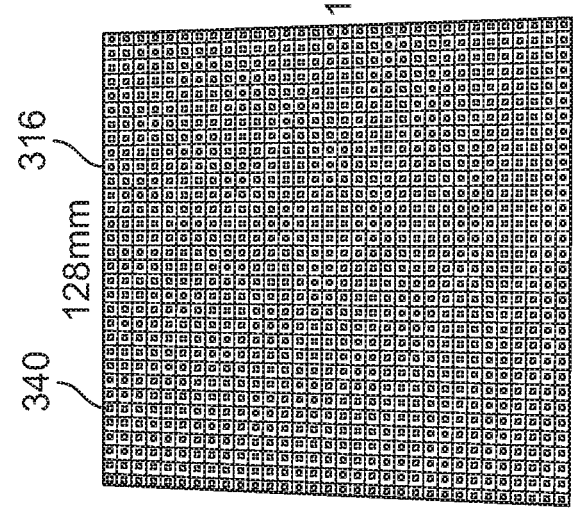
FIG. 14 is a front view of a portion of an example of an LED module of the display device shown in FIG. 2.

FIGS. 14-16 illustrate aspects of an example of the LED module 316. The illustrated LED module 316 includes three basic layers: an outside plastic mask 340 (around LEDs), the printed circuit board 342, and a plastic rim 344 with mounting nuts 346 surrounding the circuit board 342. In one example, the illustrated module 316 is 128 mm high, 128 mm wide, and 14 mm deep. In some examples, a P4 LED display module from Shenzhen Teeho Optoelectronic Co., Ltd., with a 32×32 LED array and a 4 mm LED pitch is used for the LED module 316.

Figure 17:
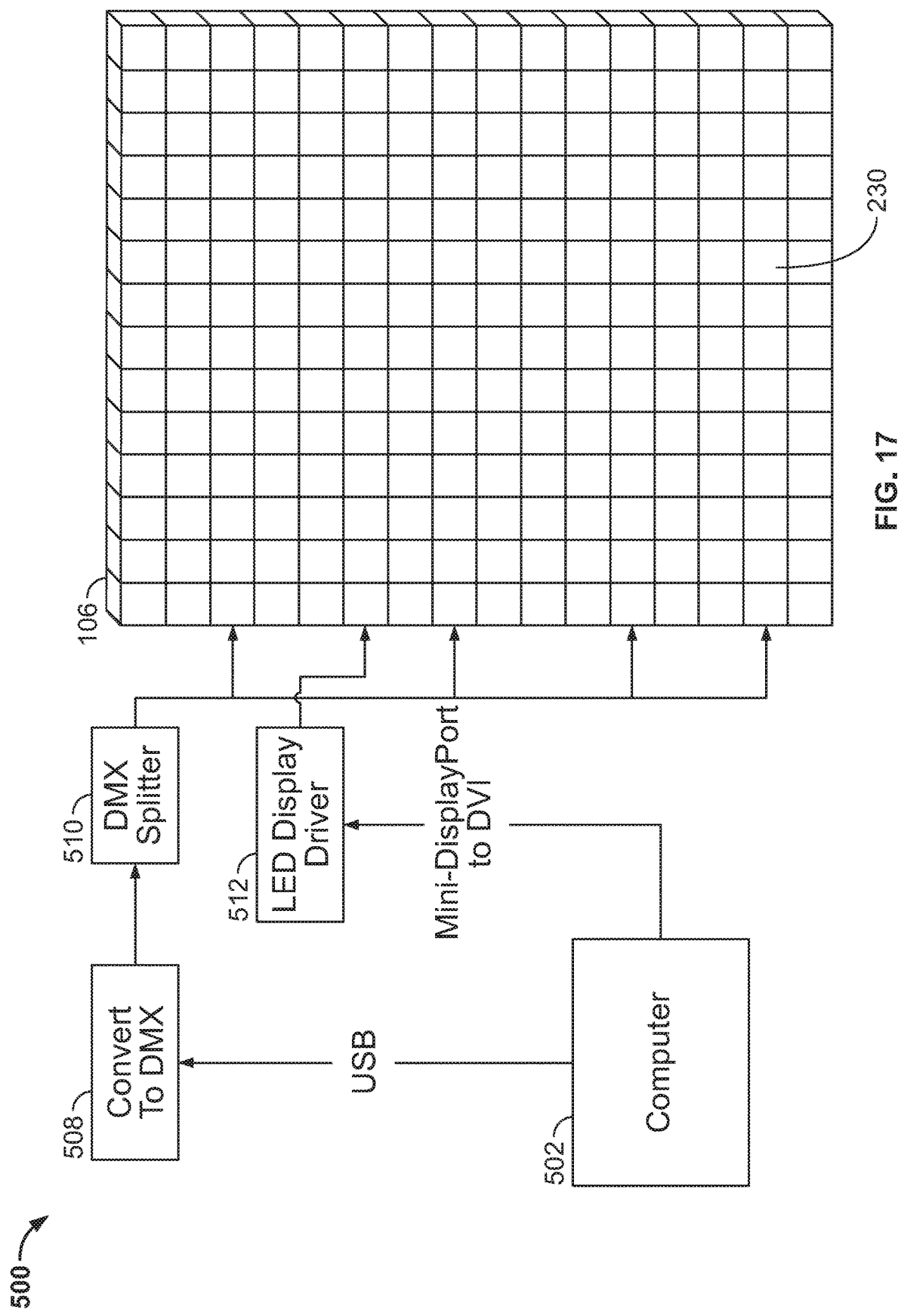
FIG. 17 is a schematic view illustrating an example of a display device architecture.

Referring now to FIG. 17, an example system 500 for controlling the display device 100 is shown. In this example, a computing device 502 communicates with each of the light assemblies 230. The computing device 502, for example, may be a local or remote computing device, such as a desktop, laptop, tablet computer, smart phone, etc. The computing device 502 can use a standard communication protocol, such as DMX, CANOPEN, USB, Ethernet, RS485, etc. to control the display device 100. The control by the computing device 502 can include programming the movement of each of the light assemblies 230. In one example, an application programming interface (API) is provided that assists in the programming of the movement of the light assemblies 230.

In the illustrated example, control signals for controlling movement of the actuator assemblies 232 are output by the computing device 502 via a USB output, and converted to DMX signals by an appropriate converter 508 which, in turn, communicates with the display device 100 through a DMX splitter 510. Other configurations are possible.

In one example, the actuators 262 of the actuator assemblies 232 are controlled by the computing device 502 according to a percentage of extension for the moving cube 314. For example, the computing device 502 defines a percentage, such as 0 percent, 10 percent, 25 percent, 50 percent, 75 percent, and/or 100 percent for the moving cube 314 at a given point in time. The percentage is translated to instructions transmitted to the appropriate actuator 262 to extend or retract the moving cube 314 the desired amount. By defining a changing percentage over time, the movement of the moving cube 314 can be choreographed, as desired.

In addition, the computing device 502 can define colors to be displayed by the LED module carried by the moving cube 314. The colors of the LEDs on the LED modules 316 can be changed to create the desired effect. LED control signals are output by the computing device 502 to an LED display driver 512, which communicates with the LED modules 316 of the light assemblies 230.

Since each of the actuator assemblies 232 can be individually controlled separately, the movement and color of each of the actuator assemblies 232 can be controlled to create patterns or other visual effects for the display device 100.

For example, the actuator assemblies 232 in a certain area of the display can be extended and retracted in coordination to give the appearance of movement of the display device 100. In one such example, the actuator assemblies 232 are controlled to provide a wave-like effect across the display device 100. In another example, the control is randomized, so that the actuator assemblies 232 move in random patterns. Other configurations and patterns are possible.

By controlling the display device 100 in this manner, the overall visual impact of the display device 100 is increased. Specified patterns can be used to further enhance the visual effect of the display device 100, thereby catching the eye of a viewer.

In some examples, the patterns are configured to make certain shapes and depictions. For example, as shown in FIG. 1, the actuator assemblies 232 in the dynamic area 106 are patterned to represent the shape of a contoured bottle. To accomplish this, each of the actuator assemblies 232 is controlled to extend and/or retract a certain distance to form the pattern of the bottle. An endless number of shapes and depictions can be created in this manner. In addition, the shapes can be used to morph over time into a choreographed series of shapes.

For example, the computing device 502 can be programmed to create various shapes on the display device 100 depending on the time of day, as well as control the sequence of those shapes. The sequence can be choreographed or randomized, as desired. For example, in one embodiment, the computing device 502 can control the sign to depict fluid flowing out of a bottle. Many other examples are possible.

Figure 18:
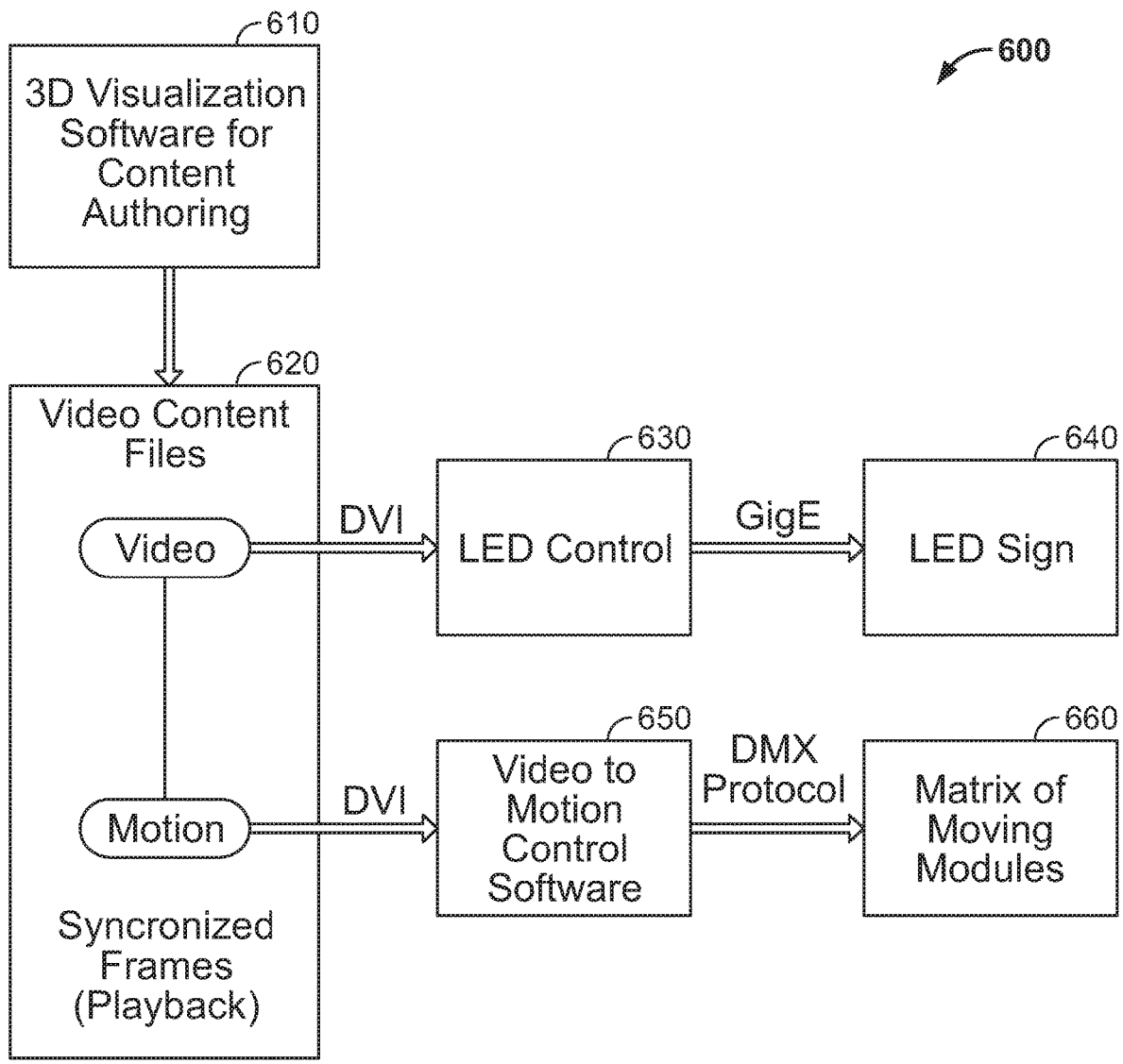
FIG. 18 is a block diagram illustrating an example process for controlling a display device.

Referring now to FIG. 18, an example process 600 for controlling the display device 100 is shown. Some of the operations in this process 600 can be implemented, for example, by the computing device 502.

At operation 610, a video creation software application such as a three-dimensional visualization software is used to author content for the display device 100. The software, which is executed by the computing device 502 (or any other computing device, not necessarily connected to the display device 100), allows for the creation and/or manipulation of video content that will be used to control the display device 100. The software optionally includes an emulator that depicts the display device 100 to allow a user to author different content for the display device. One example of such content is an advertisement featuring a bottle. The advertisement can define the shape, motion, and color of the bottle to be depicted on the display device 100.

Next, at operation 620, the content is edited into video (i.e., color) and motion components. This is accomplished by extracting the video and motion components so that dual synchronized video files are formed. The first video file is for controlling the light display (the LED modules), and the second video file is for controlling the motion (i.e., the moving cubes).

The first video file is transferred to operations 630, 640, whereat the LED modules of the display device 100 are controlled. This includes controlling which of the LED modules are active and any content displayed on the LED modules. In this example, the LED modules are controlled using the GigE protocol.

The second video file is transferred to operation 650, whereat the motion file is interpreted and translated into the DMX protocol. This protocol is, in turn, used at operation 660 to control movement of the moving cubes of the actuator assemblies by the servo motor.

By synchronizing the first and second video files, the visual and motion components of the display device 100 are synchronized to create the desired effects as defined by the author.

In these examples, the computing device 502 includes one or more processing units and computer readable media. Computer readable media includes physical memory such as volatile memory (such as RAM), non-volatile memory (such as ROM, flash memory, etc.) or some combination thereof. Additionally, the computing device can include mass storage (removable and/or non-removable) such as a magnetic or optical disks or tape. An operating system, such as Linux or Windows, and one or more application programs can be stored on the mass storage device. The computing device can include input devices (such as a keyboard and mouse) and output devices (such as a monitor and printer).

The computing device also includes network connections to other devices, computers, networks, servers, etc. In example embodiments, the computing device communicates with other components through one or more networks, such as a local area network (LAN), a wide area network (WAN), the Internet, or a combination thereof. Communications can be implemented using wired and/or wireless technologies.

Figure 19:
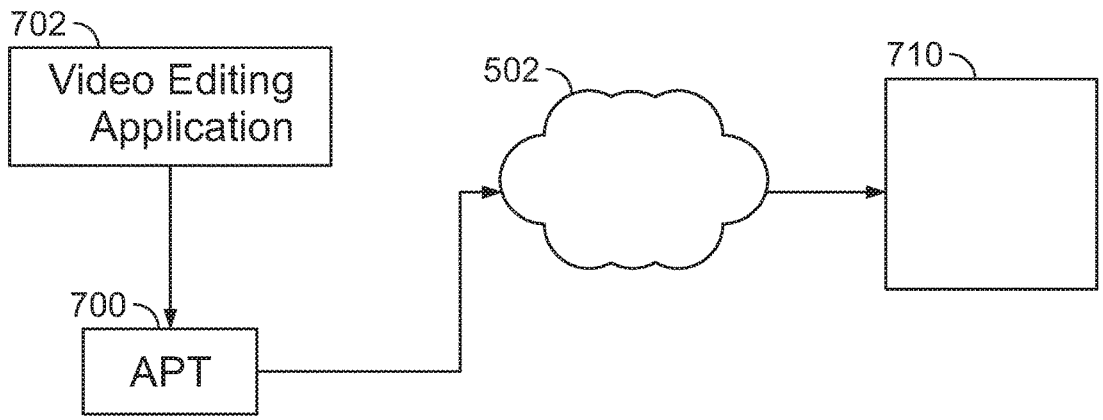
FIG. 19 is a block diagram illustrating aspects of an example Agency Preview Tool.

FIG. 19 illustrates further example aspects of the system 500 and process 600 shown in FIGS. 17 and 18. A preview tool, sometimes referred to herein as the "Agency Preview Tool" (APT), is provided in some disclosed implementations. The APT 700 allows agencies preparing content for the display device 100 to preview content as it will appear on the display device 100. Additionally, embodiments of the APT 700 correctly format video content that is to be exported for display on the device 100 to ensure its compatibility with the various components of the system 500. Among other things, this allows creative preview and experimentation while creating new content, visual verification of correct synchronization between the video content, and the movement content that drives the movement of the actuator assemblies 232. In some examples, the APT 700 further checks to insure technical compliance of the created content with the physical capabilities and limits of the display device 100. For instance, the APT 700 may verify that the content to be displayed does not require the actuator assemblies 232 to move faster than they are capable of moving. Content to be displayed is exported in a format ready for integration, including files with content suitable for display on the display device 100, encoded module movement content, a sign preview, and metadata containing information such as the estimated power consumption of the content, for example.

Embodiments of the APT 700 receive as inputs a display video intended to be shown on the LED modules 316, and a movement video which is an encoded representation of the LED module movement. As shown in FIG. 19, the APT 700 receives the display and movement videos from a video editing application 702. In certain implementations, the movement video is a movie that matches the display video's dimensions but is a black and white or greyscale video. Black represents an actuator assembly 232 that is fully retracted, and white represents an actuator assembly module 232 that is fully extended. The motion control video is discussed further below.

Figure 20:
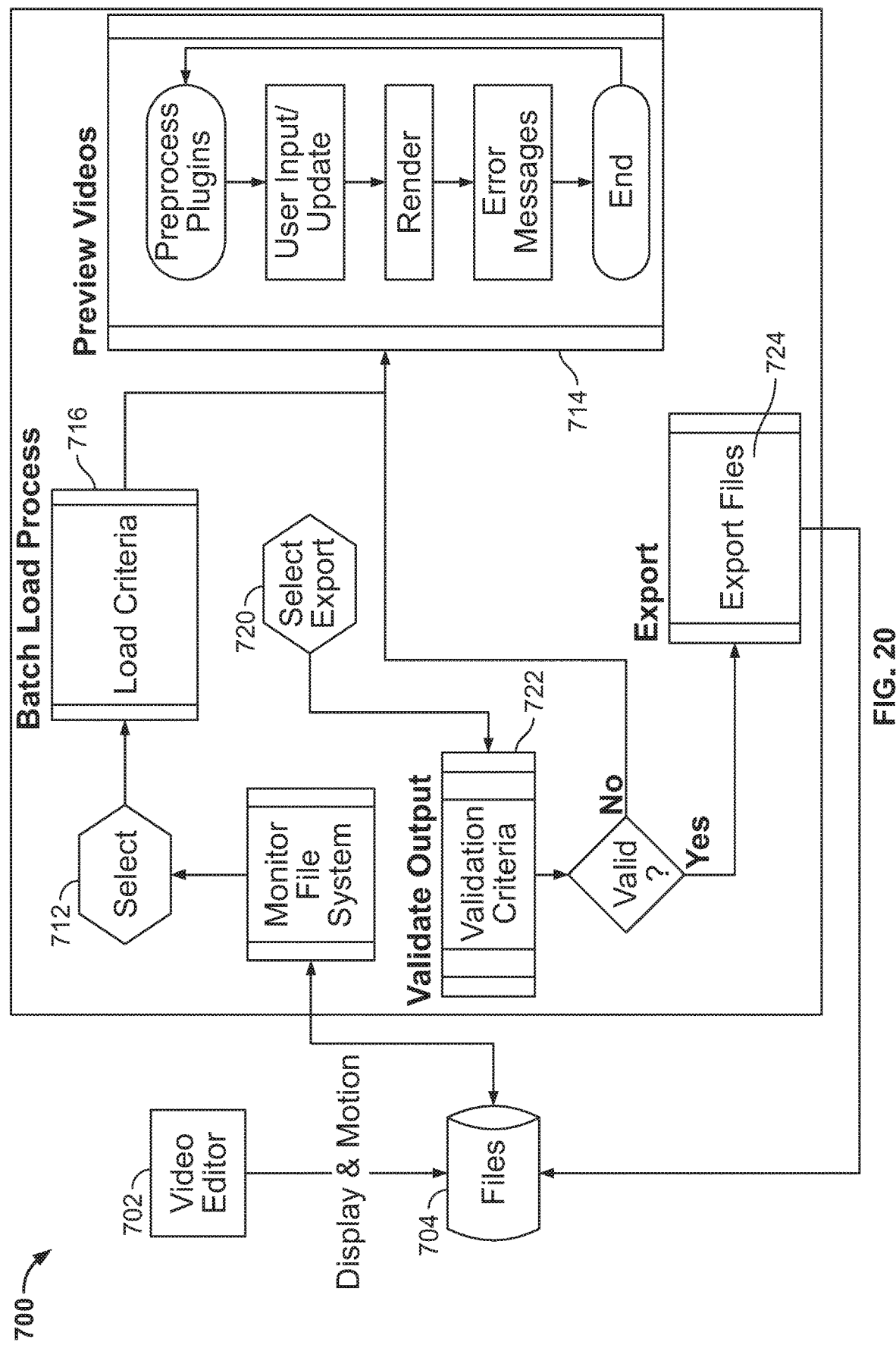
FIG. 20 is a block diagram illustrating further aspects of the Agency Preview Tool of FIG. 19.

FIG. 20 illustrates further aspects of an example APT 700. The content and motion video files are provided from the video editor 702 to a file storage system 704. The user selects the desired video files from the file storage 704, and the selected files 712 are loaded to a preview process 714 via a batch load process 716. Some versions of the APT 700 estimate and/or simulate additional information. In the APT shown in FIG. 20, for example, power consumption by the display device 100 is estimated during the batch load process 716, and the user may be informed if power consumption for the provided display content equals or exceeds a threshold. Additionally, content to be displayed may be analyzed for excessive movement. During preview of the display, the APT may display inline warning/error messages identifying content that contains excessive movement.

Examples of the APT 700 further provide the ability to export the content once the user has completed creating and previewing it. With the system illustrated in FIG. 19, the APT 700 outputs content over a network such as the internet 710 to a device controlling the display 100, such as the computing device 502. Upon selection by the user in process 720, content to be exported is validated in a validation process 722 prior to export. If content to be exported is found invalid (power consumption or actuator movement is outside predetermined thresholds, for example) the user is notified via the preview process 714.

Valid export data 724 include, for example, a file with video correctly formatted for display by the LED controllers 370, and a file with video correctly formatted for interpretation for movement by the actuator assemblies 232.

As noted above, some embodiments of the APT 700 provide the interface for including actuator assembly 232 movement along with the displayed video content. End users may either create movement to go along with their display videos using a video editing application 702 of choice, or they may select default movement files provided within the APT. For example, the APT 700 may include a library of pre-generated movement videos that define predetermined movement patterns available for users of the APT 700.

Embodiments of the APT 700 are configured to verify that the video and motion files are the same length. If the files are not the same length, various solutions may be employed. For example, if the content video is longer than motion video, an error message is presented to the user informing them if they continue the motion content will be looped. If the motion video is longer than the content video, an error message is presented to the user informing them if they continue the motion content will be truncated.

To combine the content and movement video files to simulate the video and motion together, both a content video file and corresponding movement file are loaded to the APT 700 from the editing application 702. For the content video file, the APT 700 checks for the appropriate file type, length, etc. in the validation process 722. Each video frame is read in sequence and converted to an image for manipulation by a three dimensional simulator. As noted above, the disclosed example display device 100 includes a grid having movable LED modules 316. The content video file is thus split into a corresponding grid for display on the individual LED modules 316 of each module 222. The movement file is the same size as the content video file, and is also split into a corresponding grid.

Figure 21:
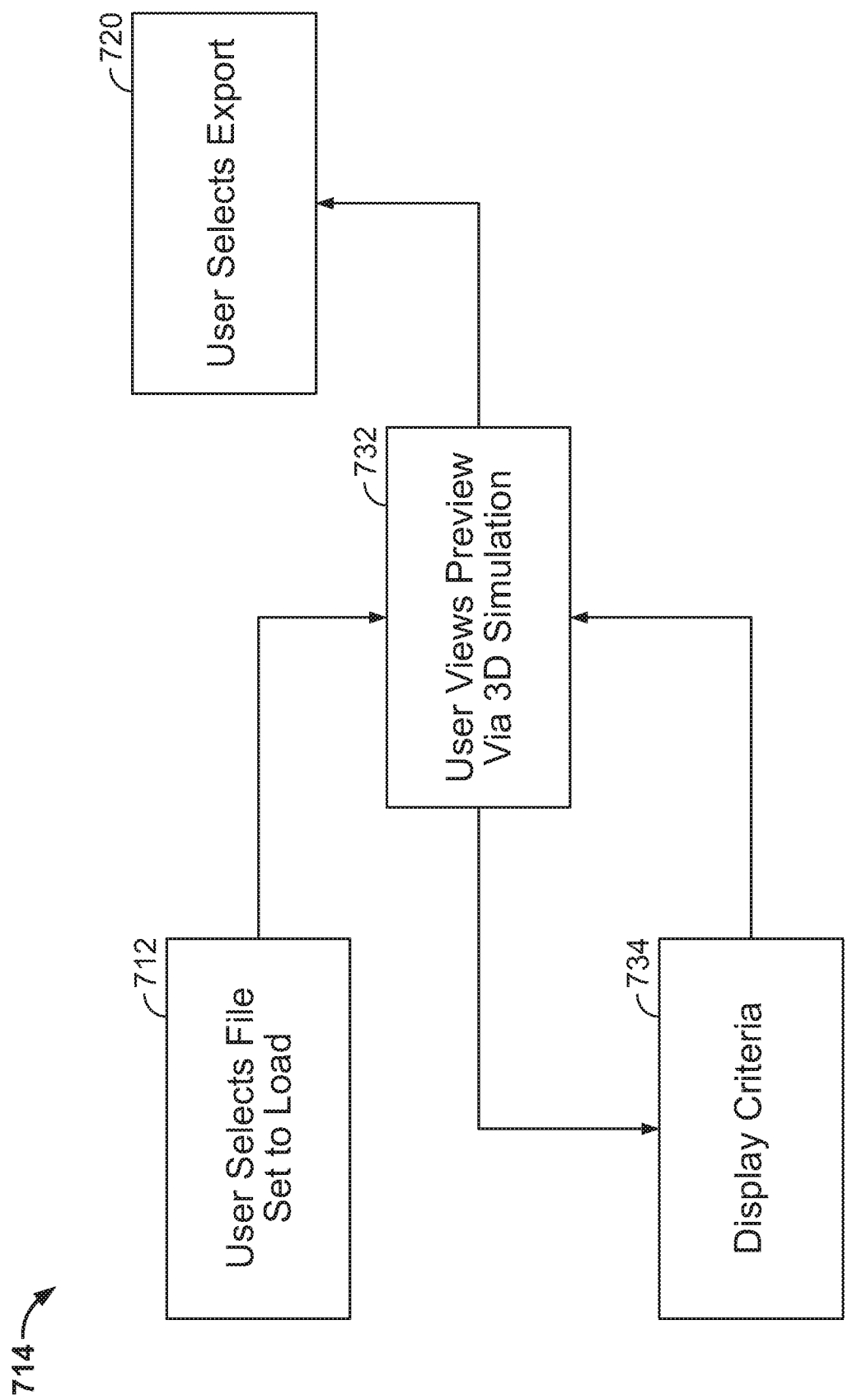
FIG. 21 is a schematic view of a process for exporting content from the Agency Preview Tool of FIG. 25.
Figure 22:
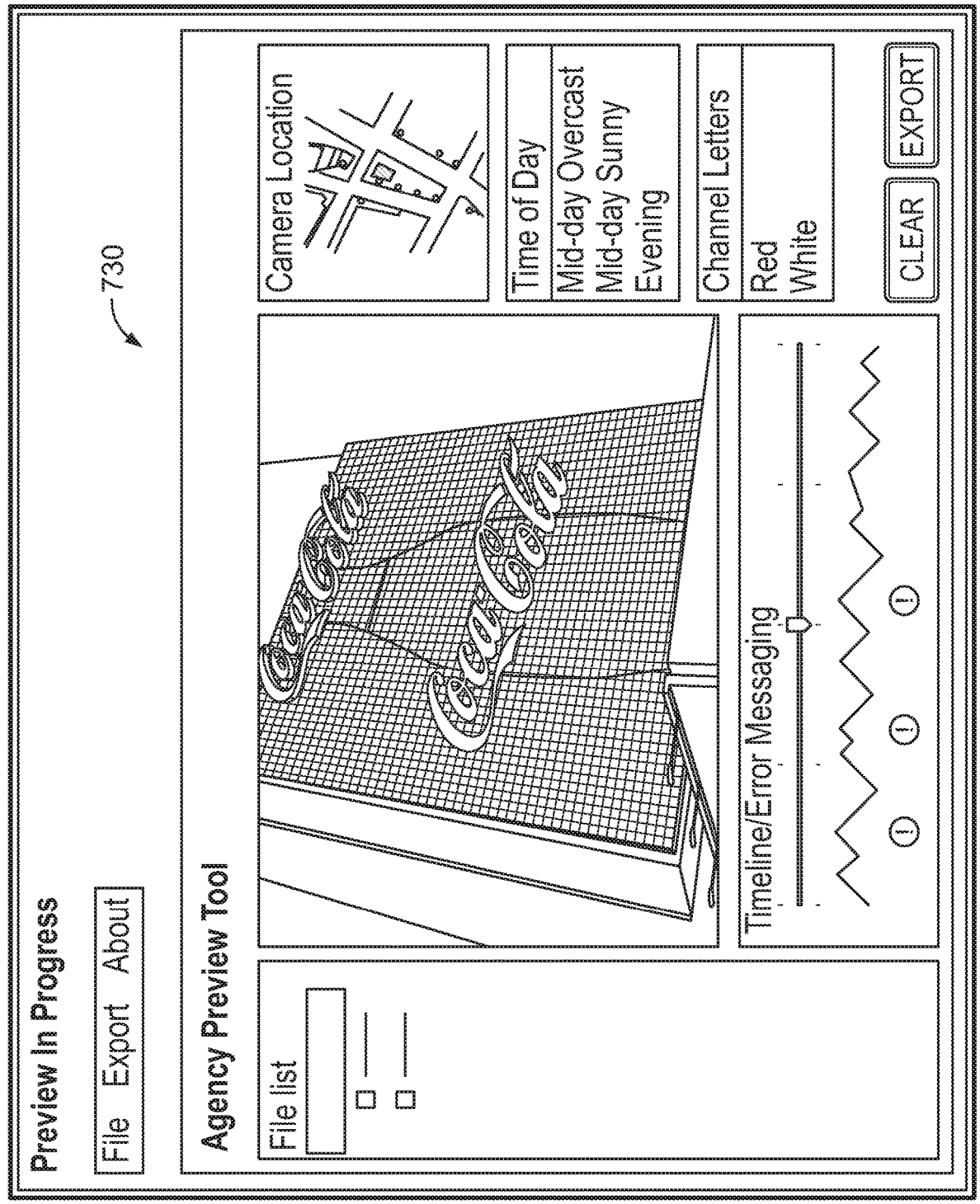
FIG. 22 is an example screen shot from an Agency Preview Tool application.

FIG. 21 illustrates further aspects of the preview process. The user selects files to be loaded from the file storage 704. Embodiments of the APT 700 allow a user to preview content in a three dimensional simulation as it will appear on the display device 100 according to various display conditions such as various distances, angles, and daylight conditions (sunny, overcast, evening, etc.). For example, the APT 700 may be configured to provide previews simulating the display device 100 from distances of 70 feet, 150 feet, and 250 feet. Accordingly, as depicted in FIG. 21, the user selects can selected desired display criteria 734 for the three dimensional simulation 732. FIG. 22 illustrates a screen shoot 730 of an example APT 700, showing examples of such user choices such as the desired time of day, camera position, colors for the stationary 104 display (channel letters), colors for and side panel 180 areas, etc. After previewing, the user may export the files for display 720.

Figure 23:
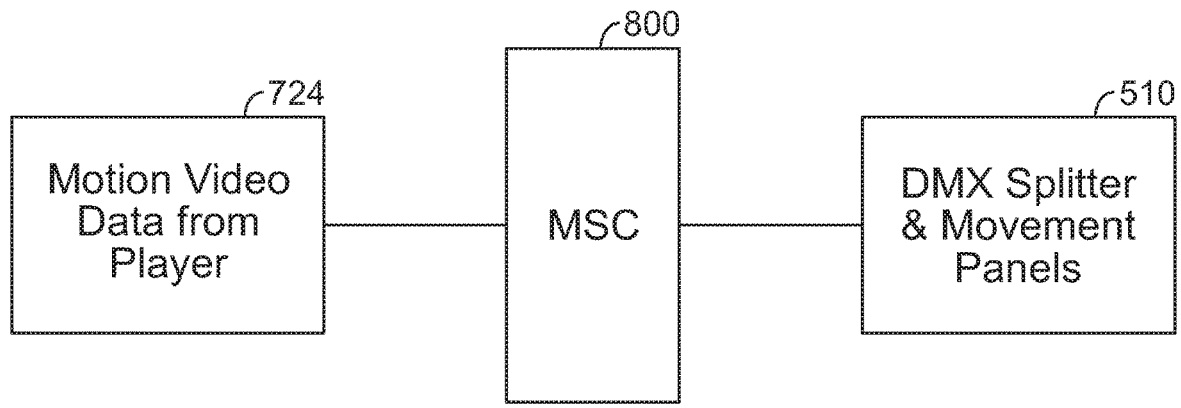
FIG. 23 is a block diagram illustrating aspects of a Movement Software Controller.

As noted above in conjunction with FIG. 17, motion content is sent to the display device 100 via a DMX splitter 510. In some example implementations, the movement software controller (MSC) provides the movement information that is sent to the actuator assemblies 232 via the DMX splitters 510. In some examples, the MSC is implemented by the computer 502. FIG. 23 illustrates aspects of an example MSC 800, which includes components that manage and communicate with the actuator assemblies 232. As shown in FIG. 23, the MSC 800 receives the exported data (motion video) 724 as verified by the APT 700, and converts the motion video data to a format suitable for controlling the actuator assemblies 232. The movement control data are then sent to the display device via the DMX splitters 510.

In certain implementations, the MSC 800 is installed at the location of the display device 100 and provides operational functionality for the movement of the actuator assemblies 232. In some embodiments, the DMX protocol (DM512) is used for communicating to the actuator assemblies 232. The signals output by the MSC are thus converted to DMX instructions suitable for controlling the actuator assemblies 232. In some embodiments, the LightFactory control system from dreamsolutions of Auckland, New Zealand is used to convert the greyscale video signal data into DMX512 instructions.

Figure 24:
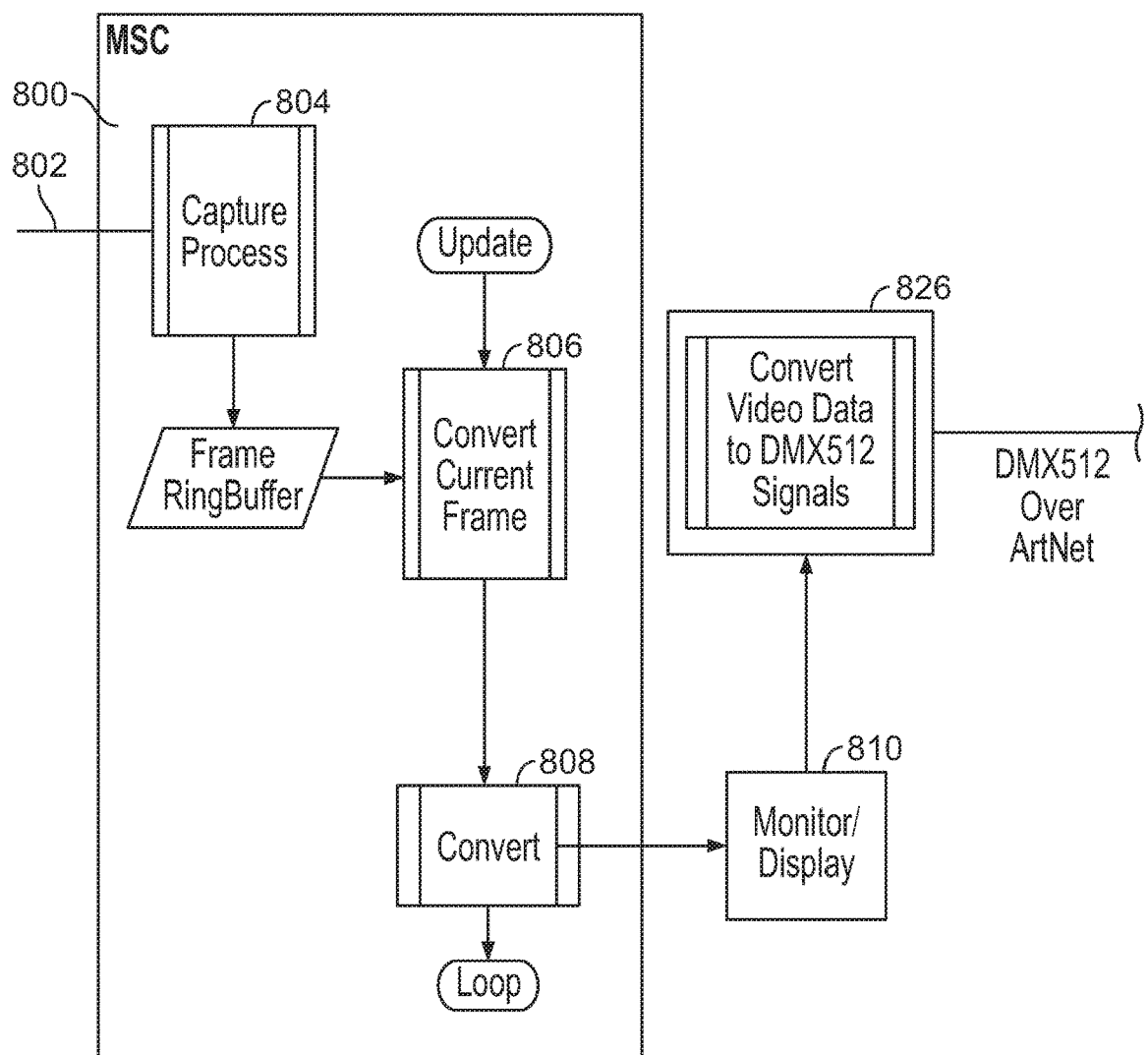
FIG. 24 is a block diagram illustrating of further aspects of the Movement Software Controller of FIG. 23.

FIG. 24 illustrates further aspects of an example of the MSC 800. The MSC 800 receives the motion video data that includes the information for controlling movement of the actuator assemblies 232, for example, via a DVI cable 802. In some implementations, the greyscale motion video is a 1200×1600 30 fps video accessed via a capture card 804. The greyscale video data are converted to motion data frame by frame in a conversion process 806. The movement video signal is captured at 30 fps, and each video frame is converted to an image for manipulation by the MSC 800. The video frames will be converted to module data split into a grid to match the grid of the display device 100, with an individual value for each actuator assembly that defines the position of the actuator assembly 232. This is then used as the "movement" values for the corresponding actuator assemblies 232 that move the LED modules 316 in the grid. In one example, the movement values range from 1 (black, actuator assembly 232 fully retracted) to 51,000 (white, actuator assembly 232 fully extended).

A conversion process 808 converts the motion data to visual data, and the MSC 800 displays the motion data as a visual output (the greyscale data is displayed to the MSC monitor 810). Each frame of movement data is converted to a greyscale red, green and blue value. This greyscale value is drawn to the screen 810 as 28 pixel wide by 28 pixel high squares arranged in a grid (exactly like the movement video file exported from the APT 700). The visual motion data is converted to an internal representation of motion. The greyscale value for video for each module is converted into a numeric value between 0 and 255 (0 being completely black and 255 being fully white). The greyscale numeric value is then converted to DMX512 instructions such that the numeric values correspond to the extension of the actuator assemblies 232 as described above.

In some implementations, the MCS 800 further includes a power usage detection process that monitors power consumption of the display device 100. For example, a power consumption threshold parameter may be determined and used as an input to the MSC 800. Power usage is monitored for module movement, LEDs, and other ancillary components. If power usage exceeds the threshold parameter, a warning or message is sent to an event log.

Figure 25:
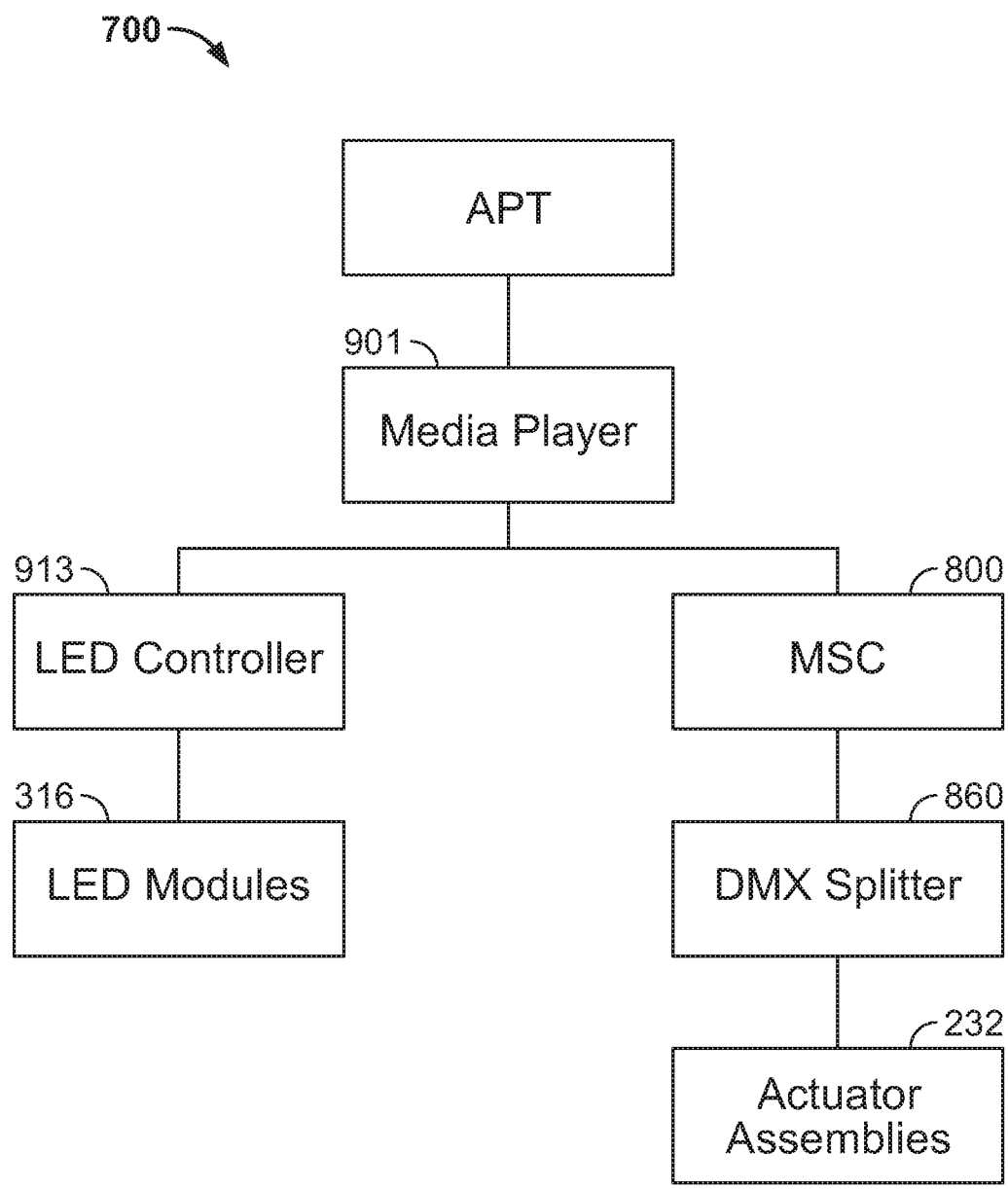
FIG. 25 is a block diagram illustrating of further aspects of the example system of FIG. 18.

FIG. 25 illustrates a further example of the system 500. The video content file for controlling the display on the LED modules and the greyscale video providing movement information are sent to a media player 901 for the dynamic area 106 of the display device 100, w which receives both the video content and movement videos. The content video is then received by an LED controller 913, which in turn distributes the content information to the individual LED modules 316. The MSC 800 receives the motion control information from the media player 901 over DVI, and the motion data is converted to DMX motion signals that are sent to a DMX splitter 860 over DMX512 for controlling the individual actuator assemblies 232 for moving the LED modules 316.

The various embodiments described above are provided by way of illustration only and should not be construed to limiting. Those skilled in the art will readily recognize various modifications and changes that may be made to the embodiments described above without departing from the true spirit and scope of the disclosure or the following claims.

What is claimed is:

1. A display device, comprising:
   a housing including side panels with handles attached thereto and a pair of rear access doors at a rear side of the housing;
   a cart, wherein the housing is situated on the cart;
   a display area including a stationary area and a dynamic area, the stationary area including a lift-off header situated on top of the housing;
   a grid assembly received in the housing;
   a plurality of light assemblies coupled to the grid assembly, the plurality of light assemblies being positioned in the dynamic area, the rear access doors providing access to the plurality of light assemblies, each of the light assemblies including an actuator assembly, each one of the actuator assemblies being individually controllable to move the corresponding light assembly in and out of the dynamic area between a retracted state and a plurality of extended states; and
   a controller coupled to each of the plurality of light assemblies, the controller being programmed to control the actuator assemblies to move the light assemblies between the retracted state and the plurality of extended states.

2. The display device of claim 1, wherein each of the light-assemblies includes:
   a stationary core;
   a cable tray coupled to the stationary core;
   a moving cube movably coupled to the cable tray, the moving cube including two panels, the panels being attached to a bracket and positioned about the cable tray; and
   an actuator coupled between the cable tray and the moving cube, the actuator being programmed to move the moving cube between the retracted state and the plurality of extended states.

3. The display device of claim 2, wherein the actuator includes a logic controller that is programmed to control a servo driver system, the servo driver system being configured to control a motor that moves the moving cube.

4. The display device of claim 2, wherein the actuator includes a stepper motor that moves the moving cube.

5. The display device of claim 1, wherein the grid assembly has 140 or fewer of the light assemblies coupled thereto.

6. The display device of claim 1, wherein the plurality of light assemblies are arranged in a grid pattern.

7. The display device of claim 1, wherein the cart is movable on a plurality of casters.

8. The display device of claim 7, wherein the cart includes a cart frame to which the plurality of casters are attached, wherein a cart cover is fastened over the cart frame to support the housing, and wherein the lift-off header houses an audio speaker for the stationary area.

9. The display device of claim 1, wherein the plurality of light assemblies are arranged at a front side of the housing.

10. A system for displaying content, the system comprising:
    a display device including:

a housing including side panels with handles attached thereto and a pair of rear access doors at a rear side of the housing;

a cart, wherein the housing is situated on the cart;

a display area including a stationary area and a dynamic area, the stationary area including a lift-off header situated on top of the housing;

a grid assembly received in the housing;

a plurality of light assemblies coupled to the grid assembly, the plurality of light assemblies being positioned in the dynamic area, the rear access doors providing access to the plurality of light assemblies, each of the light assemblies including an actuator assembly and a light module, each one of the actuator assemblies being individually controllable to move the corresponding light assembly in and out of the dynamic area between a retracted state and a plurality of extended states; and a controller coupled to each of the plurality of light assemblies, the controller being programmed to control the actuator assemblies to move the light assemblies between the retracted state and the plurality of extended states; and a computing device configured to generate content for the display device, the computing device including:

memory; and a processing unit encoding instructions that, when executed by the processing unit, cause the processing unit to control the actuator assemblies and the light modules.

11. The system of claim 10, wherein the computing device is further programmed to execute a content authoring application configured to generate a three dimensional visualization of the display device.

12. The system of claim 10, wherein each light module includes a plurality of light emitting diodes (LEDs).

13. The system of claim 10, wherein the computing device is programmed to generate content for controlling the display device, the content including first content configured to control motion of the actuator assemblies and second content configured to control content displayed by the light modules.

14. The system of claim 13, wherein the first content and the second content include first and second video files, respectively.

15. The system of claim 14, wherein the first video file includes a greyscale video.

16. The system of claim 15, wherein the greyscale video includes black pixels that indicate a fully retracted state of an associated actuator assembly, white pixels that represent a fully extended state of the associated actuator assembly, and intermediate grey pixels that represent intermediate states of the associated actuator assembly.

17. The system of claim 10, wherein the grid assembly has 140 or fewer of the light assemblies coupled thereto.

18. The system of claim 10, wherein the plurality of light assemblies are arranged in a 9×13 grid pattern.

19. The system of claim 10, wherein the plurality of light assemblies are arranged in a 10×14 grid pattern.

20. The system of claim 10, wherein the housing is less than 70 inches tall and less than 50 inches wide.

* * * * *